United States Patent [19]

Richetta et al.

[11] Patent Number: 5,579,307

[45] Date of Patent: Nov. 26, 1996

[54] PACKET ROUTING SYSTEM AND METHOD WITH QUASI-REAL-TIME CONTROL

[75] Inventors: Peter J. Richetta, Tempe; Kenneth M. Peterson, Phoenix; Victor H. Cutler, Jr., Mesa, all of Ariz.

[73] Assignee: Motorola, Inc., Schaumburg, Ill.

[21] Appl. No.: 409,288

[22] Filed: Mar. 23, 1995

[51] Int. Cl.$^6$ ........................... H04B 7/14
[52] U.S. Cl. ................ 370/54; 370/60; 379/220; 455/13.1
[58] Field of Search ............... 370/17, 54, 58.1, 370/58.2, 58.3, 60, 92, 94.1, 104.1, 105; 379/220; 395/200; 455/12.1, 13.1, 13.2; 342/350; 375/219

[56] References Cited

U.S. PATENT DOCUMENTS

| | | | |
|---|---|---|---|
| 4,756,019 | 7/1988 | Szybicki | 379/112 |
| 4,905,233 | 2/1990 | Cain et al. | 370/94.1 |
| 4,974,224 | 11/1990 | Boone | 370/94.1 |
| 5,128,926 | 7/1992 | Perlman et al. | 370/54 |
| 5,218,676 | 8/1993 | Ben-Ayed et al. | 395/200 |
| 5,253,161 | 10/1993 | Nemirovsky et al. | 364/402 |
| 5,353,283 | 10/1994 | Tsuchiya | 370/60 |
| 5,377,262 | 12/1994 | Bales et al. | 379/220 |
| 5,440,547 | 8/1995 | Easki et al. | 370/60 |

*Primary Examiner*—Benedict V. Safourek
*Assistant Examiner*—Ricky Q. Ngo
*Attorney, Agent, or Firm*—Gregory J. Gorrie

[57] ABSTRACT

In a system that includes a constellation of satellite communication nodes, information packets are routed through the constellation using routing tables stored in each communication node. When a packet is received at a node, the packet's destination and routing table ID are read. One of several routing tables are selected using a mapping table. Each of the several routing tables has a different routing instruction set. The packet is routed away from the node using the selected routing table. When system traffic is heavy, or some of the communication links are overloaded or have failed, routing table control bits are sent to the nodes updating the mapping table. Packets are subsequently routed using different sets of routing tables, such as ones having greater hop counts.

11 Claims, 7 Drawing Sheets

ROUTING TABLE

| n | \multicolumn{8}{c}{DESTINATION NODE} |
|---|---|---|---|---|---|---|---|---|
|   | 1 | 2 | 3 | 4 | 5 | ••• | 65 | 66 |
| 1 |   |   |   |   |   |   |   |   |
| 2 |   |   |   |   |   |   |   |   |
| 3 |   |   |   |   |   |   |   |   |
| 4 |   |   |   |   |   |   |   |   |
| 5 |   |   |   |   |   |   |   |   |
| • |   |   |   |   |   |   |   |   |
| 65 |  |   |   |   |   |   |   |   |
| 66 |  |   |   |   |   |   |   |   |

(SOURCE NODE)

*FIG. 5*

| 1 | n |
|---|---|
| 2 | n |
| 3 | n |
| 4 | n |
| 5 | n |
| 6 | n |
| 7 | n |
| 8 | n |

*FIG. 6*

PACKET ROUTING SYSTEM AND METHOD WITH QUASI-REAL-TIME CONTROL

CROSS-REFERENCE TO RELATED APPLICATIONS

This application is related to U.S. patent application Ser. No. 08/251,459, filed on May 31, 1994, U.S. Pat. No. 5,467,365, entitled "PACKET ROUTING SYSTEM AND METHOD THEREFOR" which is assigned to the same assignee as the present application. This application is also related to co-pending U.S. application Ser. No. 08/607,287, now pending entitled "WASTE CANCELING PACKET ROUTING SYSTEM AND METHOD" filed concurrently herewith.

FIELD OF THE INVENTION

The present invention relates generally to communication systems. More specifically, the present invention relates to systems that route packets of information between nodes in a communication system.

BACKGROUND OF THE INVENTION

Communication systems or networks, such as those used to deliver telecommunications, to deliver video images, to interconnect computers, to provide conventional cellular communications, and the like, include any number of nodes. These networks deliver electronic communications between two points by routing the communications content from node to node within the network. As the number of nodes in a network increases and as the number of communication paths available to each network node increases, the number of potential paths available for delivering any single communication likewise increases. As the number of potential paths which are available increases, a problem of selecting an appropriate path through the network arises.

Typically, it is advantageous for the network to attempt to select the shortest possible path to minimize delay, to consume a minimal amount of network resources, and to maximize reliability in delivering communications, information flow, or other service. At the same time, actions within the network need to balance the constraints of the delay, resource consumption, and reliability with the need to prevent overloading any of the network nodes or communication links, while maintaining delivery of the network traffic. Delivery of network traffic to its intended destination is desirably made with proper allowances for statistical variations in traffic and an ability for the network to absorb instantaneous changes in requested service without having to react to the volume of traffic by devising new routing instructions.

Packet routing techniques in dynamic or moving communication systems have generally required near real-time exchange of routing update information among the communication nodes. Other packet routing techniques have required significant decision making and packet processing in the communication nodes. These techniques require significantly more resources and increase the complexity of the communication nodes. In a global communication system where nodes are space-based, minimal exchange of routing information between the nodes is desirable in order to minimize node complexity, simplify routing management, and reduce resources required for the exchange of routing information.

Alternative routing techniques that have been used in communication systems include centralized routing where updated routing tables are calculated in a centralized location and sent to each node. Examples of this include packet routing networks such as Tymnet. However, in ground based communication networks such as in Tymnet, all calls are normally processed by a single central supervisor which calculates and maintains the updated route information for each possible source-destination pair in the network. Since that single resource selects routes for each communication and assigns so-called "virtual circuit" identifiers to each, the uniqueness of such route identification is maintained for all communication needs throughout the network, and no confusion is created when several communications cross simultaneously through one intermediate node on their journey through the network. In satellite-based communication networks, the complexity and inefficiency associated with real-time exchange of route information among remotely located nodes is undesirable.

Generally, most routing tables, such as minimum hop tables, are generated so that minimal delay in transporting data packets among the communication nodes occurs. However, in dynamic or moving communication systems, minimum hops alone are not sufficient for designing routing tables. One disadvantage to minimum hop tables is that all hops are treated equally and the dynamic aspects of the system are ignored. For example, when the communication nodes are moving, delays between the nodes change and links connecting the nodes are either turned on or shut down. Traditional packet routing systems that use routing tables do not take into account changes in the connectivity among the nodes, as in dynamic or moving systems.

Another disadvantage to traditional routing tables is that the capacity of the links is not considered. Minimum hop tables route data packets along predetermined routes regardless of the amount of traffic on certain links. As a result, some links become overloaded while other links are far below capacity. These traditional methods do not take into account actual or historical traffic levels.

Furthermore, the use of traditional routing tables is inefficient for several reasons because, among other things, data packets from several sources take different routes to reach the same destination. In some situations, data packets directed to a single destination node may be traveling in both directions on one communication link in the network. Data packets directed to the same communication node traveling in both directions on a communication link is a wasted transport.

Thus what is needed are an apparatus and method for routing data packets in a dynamic and moving communication system. What is also needed are an apparatus and method for routing data packets that accommodate changes in the connectivity between the communication nodes. Desirably, changing capacity of links should also be considered.

Thus what is also needed are an apparatus and method for routing data packets that accommodate actual or historical traffic demand. What is also needed are a method and apparatus that prevents link overloads accommodating link capacity and actual traffic. What is also needed are an apparatus and method for routing data packets that are responsive to changes in system traffic.

Thus what is also needed are an apparatus and method for routing data packets that reduces the amount of data packets having the same destination traveling in both directions on one communication link. What is also needed are a routing apparatus and method which achieves uniformity in the usage of network links while limiting the number of hops between source and destination.

BRIEF DESCRIPTION OF THE DRAWINGS

FIG. 5 illustrates a representation of a routing table suitable for use in a preferred embodiment of the present invention;

FIG. 6 illustrates a representation of a mapping table for controlling routing tables suitable for use in a preferred embodiment of the present invention;

DETAILED DESCRIPTION OF THE DRAWINGS

The present invention provides, among other things, an apparatus and method for routing data packets in a dynamic and moving communication system. Also provided are an apparatus and method for routing data packets that takes into account changes in the connectivity between the communication nodes.

The present invention also provides, among other things, an apparatus and method for routing data packets that takes into account actual or historical traffic demand. Also provided are a method and apparatus that prevents link overloads taking into account link capacity and actual traffic. Also provided are an apparatus and method for routing data packets that is responsive to changes in system traffic.

The present invention also provides, among other things, an apparatus and method for routing data packets that reduces the amount of data packets having the same destination traveling in both directions on one communication link. Also provided are a routing apparatus and method which achieves uniformity in the usage of network links while limiting the number of hops between source and destination.

A "satellite" is defined herein to mean a man-made object or vehicle intended to orbit earth. A "constellation" is defined herein to mean an ensemble of satellites arranged in orbits for providing specified coverage (e.g., radio communication, photogrammetry, etc.) of portion(s) or all of earth. A constellation typically includes multiple planes (or orbits) of satellites and may have equal numbers of satellites in each plane, although this is not essential. A satellite is intended to include both geostationary and orbiting satellites and/or combinations thereof including low earth orbiting (LEO) satellites. A source node is defined here to mean a node from which a packet originates. A destination node is defined herein to mean a node to which a packet is destined.

Figure 1:
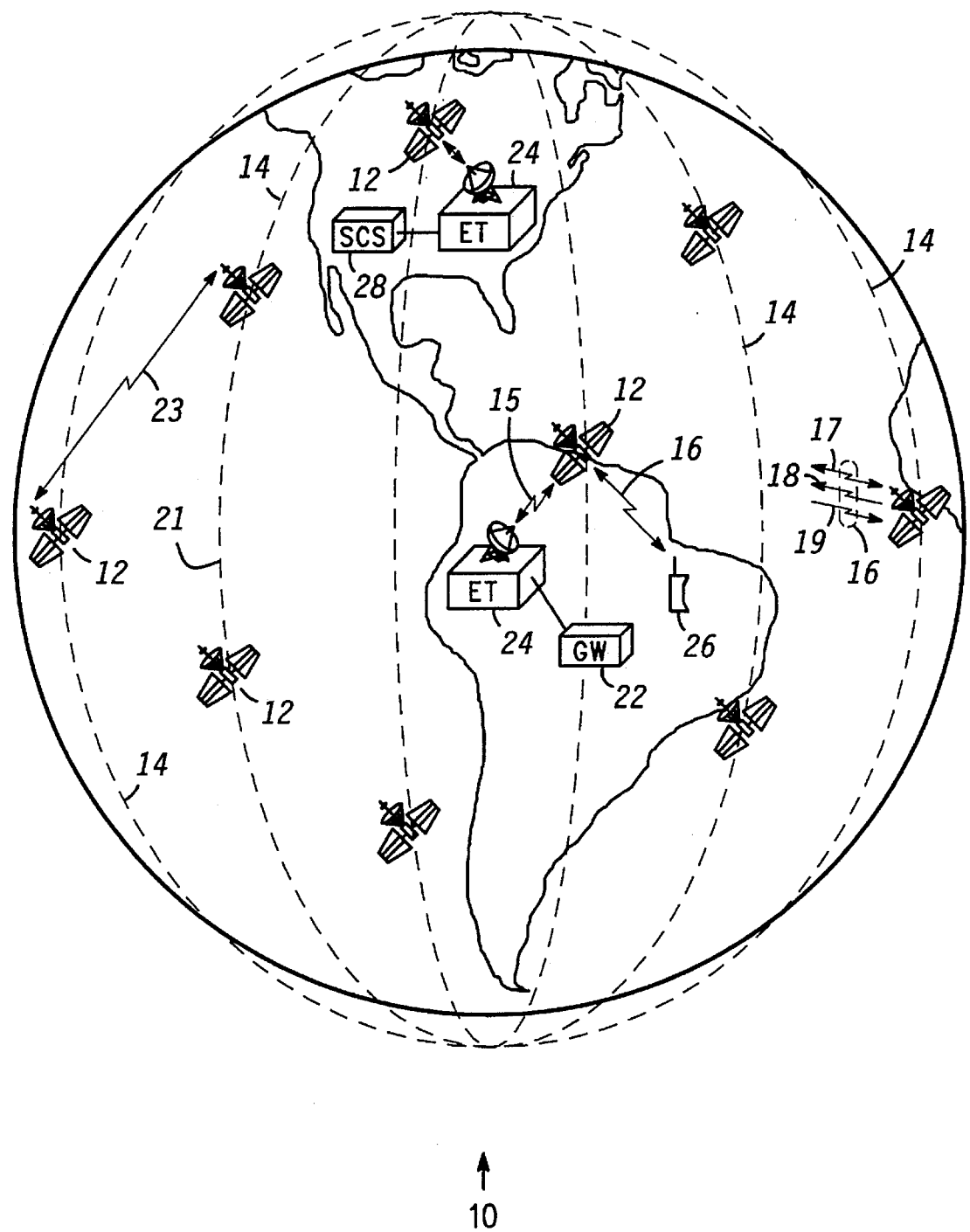
FIG. 1 illustrates a highly simplified diagram of a satellite-based communication system of which the present invention may form a portion.

FIG. 1 illustrates a highly simplified diagram of satellite-based communication system 10 of which the present invention may form a portion. Communication system 10 is shown dispersed over and surrounding earth through use of orbiting satellites 12 occupying orbits 14. Although FIG. 1 shows low-earth orbit satellites in polar orbits, the present invention is applicable to systems including satellites in low-earth, medium-earth and geosynchronous orbits. Additionally, it is applicable to orbits having any angle of inclination (e.g., polar, equatorial or other orbital pattern).

Communication system 10 uses six polar orbits 14, with each orbit 14 holding eleven satellites 12 for a total of sixty-six satellites 12. However, this is not essential and more or fewer satellites, or more or fewer orbits, may be used. While the present invention is advantageously employed when a large number of satellites are being used, it is also applicable with a few satellites. For clarity, FIG. 1 illustrates only a few of satellites 12.

Each orbit 14 preferably encircles earth at an altitude of around 780 km, although higher or lower orbital altitudes may be usefully employed. Due to the relatively low orbits of satellites 12, substantially line-of-sight electromagnetic (e.g., radio, light etc.) transmission from any one satellite or reception of signals by any one satellite involves or covers a relatively small area of earth at any instant. Satellites 12 travel with respect to earth at around 25,000 km/hr, allowing satellite 12 to be visible to a terrestrial station for a maximum period of circa nine minutes.

Satellites 12 communicate with terrestrial stations which may include some number of radio communication subscriber units (SUs) 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the earth or in the atmosphere above the earth. SUs 26 are preferably communications devices capable of transmitting data to and receiving data from satellites 12. By way of example, SUs 26 may be hand-held, portable cellular telephones adapted to communicate with satellites 12. Ordinarily, SUs 26 need not perform any control functions for communication system 10.

Communication system 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels. As a minimum, a satellite 12 continuously transmits over one or more broadcast channels 18. Subscriber units 26 synchronize to broadcast channels 18 and monitor broadcast channels 18 to detect data messages which may be addressed to them. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of a satellite 12.

On the other hand, traffic channels 17 are two-way channels that are assigned to particular subscriber units 26 by satellites 12 from time to time. In the preferred embodiments of the present invention, a digital format is used to communicate data over channels 17–19, and traffic channels 17 support Real-Time communications. At least one traffic channel 17 is assigned for each call, and each traffic channel 17 has sufficient bandwidth to support, at a minimum, a two-way voice conversation.

Satellites 12 communicate with other nearby satellites 12 through in-plane cross-links 21 and cross-plane cross-links 23. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 illustrates only two, through earth links 15. ETs 24 are preferably distributed over the surface of the earth in accordance with geopolitical boundaries. In the preferred embodiments, each satellite 12 may communicate with up to four ETs 24 and over a thousand subscriber units 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 perform call processing functions in conjunction with satellites 12 or GWs 22 exclusively handle call processing and allocation of call handling capacity within communication system 10. Diverse terrestrial-based communications systems, such as the PSTN, access communication system 10 through GWs 22.

With the example constellation of sixty-six satellites 12, at least one of satellites 12 is within view of each point on earth's surface at all times (i.e., full coverage of the earth's surface is obtained). Theoretically, any satellite 12 may be in direct or indirect data communication with any SU 26 or ET 24 at any time by routing data through the constellation of satellites 12. Accordingly, communication system 10 establishes a communication path for relaying data through the constellation of satellites 12 between any two SUs 26, between SCS 28 and GW 22, between any two GWs 22 or between SU 26 and GW 22.

Figure 2:
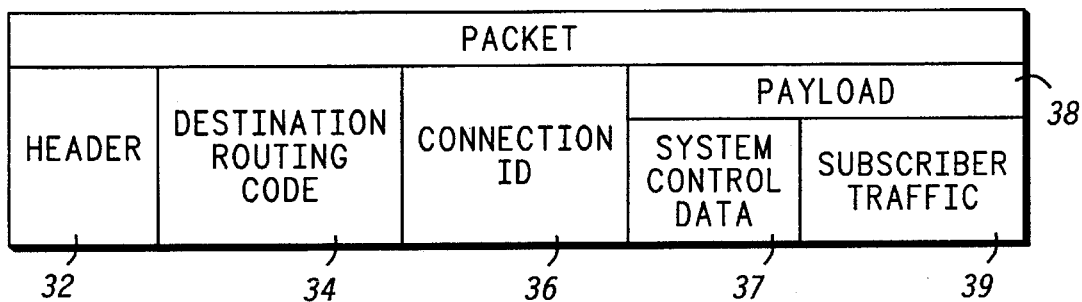
FIG. 2 illustrates a data packet used to transport communications suitable for use in a preferred embodiment of the present invention.

FIG. 2 illustrates data packet used to transport communications suitable for use in a preferred embodiment of the present invention. Data packet is used to transport communications to or from subscriber unit 26 and may be routed between satellite communication nodes 12 (FIG. 1). Packet includes header 32 which preferably carries data identifying a type characterization to be associated with packet and any other information conventionally included in data packet headers. The type characterization indicates whether packet exclusively conveys system control messages or whether it conveys subscriber traffic. Routing destination code 34 instructs system 10 (FIG. 1) where to deliver packet.

In a preferred embodiment, packet header 32 includes one or more bits allocated to packet age. Preferably, an originating node assigns a packet age count to each packet. For example, a packet age count of twenty or twenty-five may be assigned when the constellation has no failed links, and a packet age count of thirty may be assigned when there are several failed links. In this embodiment, the packet age count is decremented when a packet transitions each node and the packet is discarded when the age count becomes zero. The specific implementation of packet age count (i.e., the number of bits allocated) is not important to the present invention. Preferably, there are five bits allocated to packet age count which allow for a packet age count of up to 32. However, four bits may be used and packet age count may be decremented in every other node. One advantage to packet age count is that system load is reduced by discarding data packets that are wandering when there are failed links or other problems in the system. Packet age is discussed below in conjunction with FIG. 10.

Connection ID 36 includes a code that uniquely is associated with a particular subscriber unit 26 by the destination satellite 12 or ET 24 (FIG. 1). Destination satellites will provide a traffic channel 17 uniquely associated with the connection ID 36. Destination satellite 12 uses connection IDs 36 of packet that carry subscriber unit traffic to route such packet payload subscriber traffic 39 to traffic channels 17 assigned to the identified subscriber unit 26.

Packet header 32, routing destination code 34, and connection ID 36 represent overhead data which serve to get packet to its destination and can be profitably used in routing packets through the network. At the packet's destination, payload data 38 are consumed. In other words, the purpose of sending packet to a destination is typically to deliver payload data 38, not header 32, routing destination code 34, or connection ID 36. Payload data 38 includes either system control data 37 or system control data together with subscriber traffic 39 (e.g., voice and/or data). System control data 37 are commands or messages which are interpreted and acted upon by subscriber units 26. Subscriber traffic 39 represents subscriber data transported in the course of a call. As discussed above, a digitized version of an entire frame of conversational audio may be conveyed by subscriber traffic 39 as might a portion of subscriber provided data traffic such as might be provided by an output from a computer or properly interconnected modem.

Routing destination code 34 desirably includes a call sequence number (CSN) or logical channel number (LCN) to differentiate between various calls within a gateway or within the originating or terminating satellite. The CSN or LCN may be used to map a packet to the assigned traffic channel 17 of the link between the satellite and the SU 26. The CSN or LCN may also be included in other portions of packet.

Routing destination code 34 preferably includes a destination satellite number or other designator for the destination of the data packet. Destination routing code 34 is desirably assigned within the system and known by all satellites 12 and ETs 24 participating in the process of connection establishment. By way of example the call control gateway maintains knowledge of the constellation motion, satellite 12 positions and the time dependent coverage zone of each satellite 12 as it moves. Among other things, the destination satellite number is used by satellites 12 to route a packet to its destination satellite. At the destination satellite, the packet is transmitted on a downlink (i.e., subscriber traffic channel 17) to either a subscriber unit 26, or in the composite transmission of packets destined to a gateway 22. In one embodiment, the destination routing code includes both a source node identifier as well as a destination node identifier, both of which are preferably used in routing the packet.

Figure 3:
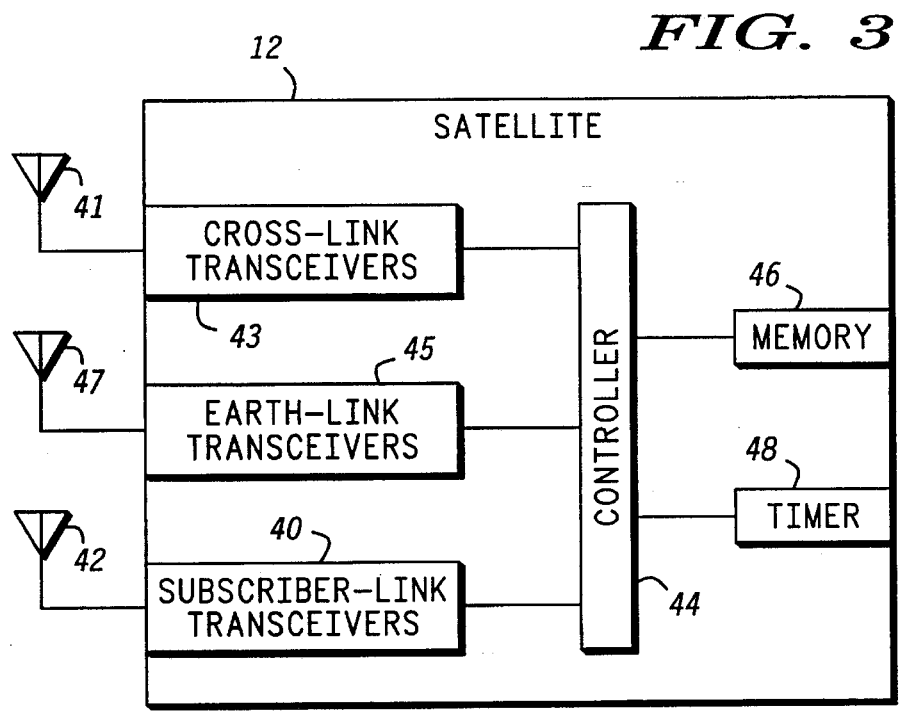
FIG. 3 illustrates a simplified block diagram of a satellite radio communication node suitable for use in a preferred embodiment of the present invention.

FIG. 3 illustrates a simplified block diagram of satellite radio communication node 12 suitable for use in a preferred embodiment of the present invention. Satellite node 12 is provided by a satellite 12 of FIG. 1. Preferably, all satellites 12 within communication system 10 (see FIG. 1) include equipment as illustrated by the block diagram of FIG. 3. Satellite 12 includes cross-link transceivers 43 and associated antennas. Cross-link transceivers 43 and antennas 41 support cross-links to other nearby satellites 12. Earth-link transceivers 45 and associated antennas 47 support earth-links to communicate with earth terminals 24 (FIG. 1). Moreover, subscriber-line transceivers 40 and associated antennas 42 support subscriber units 26 (FIG. 1). Preferably, each satellite 12 simultaneously supports a link for up to several thousand or more of subscriber units 26 (FIG. 1). Of course, those skilled in the art will appreciate that antennas 41, 47, and 42 can be implemented either as single multi-directional antennas or as banks of discrete antennas.

A controller 44 couples to each of transceivers 43, 45, and 40 as well as to a memory 46 and a timer 48. Controller 44 is preferably implemented using one or more processors. Controller 44 uses timer 48 to maintain, among other things, the current date and time. Memory 46 stores data that serve as instructions to controller 44 and that, when executed by controller 44, cause satellite 12 to carry out procedures which are discussed below. In addition, memory 46 includes variables, routing tables, and databases that are manipulated due to the operation of satellite 12.

Figure 4:
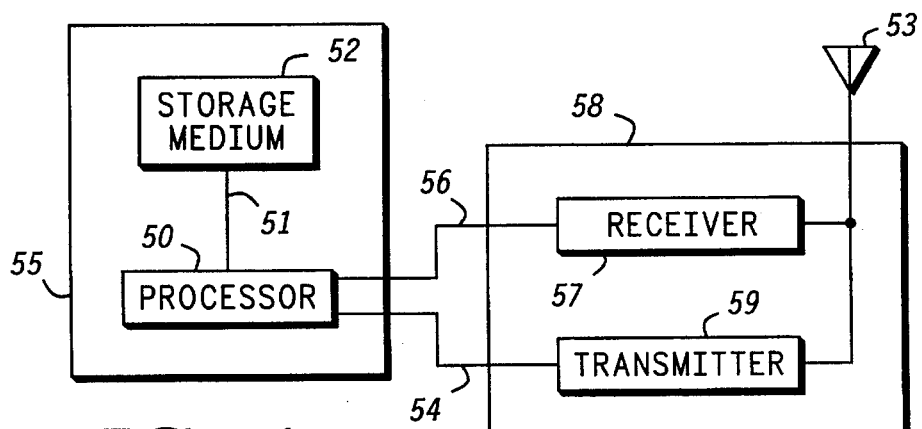
FIG. 4 illustrates a simplified block diagram of a portion of a system control station and an earth terminal suitable for use in a preferred embodiment of the present invention.

FIG. 4 illustrates a simplified block diagram of a portion of control station 55 and earth terminal 58 suitable for use in a preferred embodiment of the present invention. Control station 55 and terrestrial station 58 are desirably part of SCS 28 (FIG. 1) and ET 24 (FIG. 1) respectively. Control station 55 comprises processor 50 coupled to associated storage medium 52 (e.g., random access memory or RAM, other semiconductor or magnetic read-write memory devices, optical disk, magnetic tape, floppy disk, hard disk etc.) via link 51. Terrestrial station 58 includes antenna 53 coupled to transmitter 59 and receiver 57. Transmitter 59 and receiver 57 are coupled to processor 50 via links 54 and 56, respectively. Processor 50 desirably carries out procedures exemplified below and described in associated text. For example, in addition to performing other tasks as appropriate, processor 50 desirably stores results from such procedures in storage medium 52. Transmitter 59 and/or receiver 57 transmit messages to and/or receive messages from satellites 12.

Processor 50 generally controls and manages user access, message reception and transmission, channel set-up, radio tuning, frequency and time slot assignment, and other cellular radio communication and control functions not managed or provided for by controller 44 (FIG. 3). Among other things, processor 50 and/or controller 44 (FIG. 3) desirably executes procedures to allow user access to communication system 10.

In a preferred embodiment of the present invention, communication system 10 (FIG. 1) includes 66 LEO satellites arranged in six orbits each containing eleven satellites 12. In reference to FIG. 1, each satellite 12 is coupled to two other satellites 12 within the same orbit 14 or orbital plane by in-plane cross-links 21. The capacities of in-plane cross-links 21 remain constant because the distance between satellites within the same plane remains relatively constant.

Link capacity includes data carrying capacity. In a preferred embodiment, the cross-link capacity ranges from 100 to 200 packets for each frame time and is preferably about 140 packets per 9 milliseconds frame time. The capacities of cross-plane cross-links 23 (e.g., left and right cross-links) on the other hand vary from a maximum value when the satellites are about 4000 km apart to a minimum value when the satellites are about 2700 km apart, or the cross-plane links 23 are shut down. The change in capacities of cross-plane cross-links 23 is due to framing when TDMA is used. For example, referring to FIG. 1, satellites 12 in different orbits 14 are furthest apart when near the equator, come closer together and are relatively close together near the poles. In a preferred embodiment, cross-plane cross-links 23 are shut down when the link capacity becomes small.

Cross-plane cross-links 23 remain off until the associated satellite crosses a pole and are turned back on when this satellite 12 is at approximately a latitude of 52 degrees where the cross-link again has some capacity. The same cycle occurs as a satellite approaches the other pole. Because of the change in the east-west cross-link capacity, a time variation in link capacity occurs as the constellation moves around the earth. Moreover, as two cross-plane connected satellites travel over a pole, they switch sides in the sense of the left and right neighboring node connections. As a result, nodal connectivity and system topology varies with time.

FIG. 5 illustrates a representation of routing table 60 suitable for use in a preferred embodiment of the present invention. Each communication node 12 of system 10 preferably contains at least one routing table 60. In one embodiment, each communication node contains several routing tables 60. In the preferred embodiment, each communication node contains eight routing tables 60.

The intersection of a row and column of routing table 60 is filled with routing instructions 61 that direct a data packet to an exit link based on a destination of the data packet (e.g., destination routing code 34 (FIG. 2)). Routing table 60 illustrates one set of routing instructions for each possible route between any two communication nodes. Data packets are routed from a source node to a destination node. In this embodiment, a route is defined for each source—destination node combination. Routing table 60 illustrates source nodes 63 and destination nodes 62. In alternative embodiments (not shown) of the present invention, routing tables include only a destination node which results in routing instructions independent of a packet's source node. For example, each node may only contain a row of table 60.

The routing instruction 61 contained in the table entries are desirably a designator for one of several possible exit links from the communication node. For example, in one embodiment, routing instruction 61 include an "F" which designates an in-plane cross-link 21 which is forward (i.e., in the direction of flight of the satellite) or alternatively contain an "A" which designates the in-plane cross-link 21 which is to the aft or rear (i.e., opposite the direction of flight of the satellite). Routing instruction 61 alternatively contain an "R" which designates a cross-plane cross-link 23 with to the right, or an "L" which designates a cross-plane cross-link 23 with to the left (as viewed facing in the direction of flight). Routing instruction 61 contains many other exit link designators when a communication node has many possible exit links. The exact number of exit links and exit link designators is not important for the present invention. Routing instruction 61 alternatively contains a gateway designator which designates one of several gateway antenna subsystems that connect the satellite with the terrestrial facilities (e.g., ET 25, FIG. 1) using earth link 15 (FIG. 1).

In a preferred embodiment of the present invention, several routing tables 60 are used to route data packets. Each routing table 60 has a table number designator 64. Each of the several routing tables desirably specify different routing instruction sets. These different tables are selected, for example, based on traffic loading. Different tables are selected at times when there is a large amount of traffic volume or when there is congestion in the network. Table number one is preferably a minimum hop table while tables with higher numbers preferably result in higher hop counts. In this embodiment, the specific routing table to be used by a communication node is received at the node as part of its control data. The use of table number designators 64 allow the selection of a specific set of routing tables. This is discussed in more detail below.

When routing tables are used for a constellation of communication nodes that are changing position relative to each other, different tables are necessary for different states of the constellation. For example, in the preferred embodiment of FIG. 1, satellite nodes 12 crossing over the poles change their position relative to neighboring satellite nodes in adjacent orbits. Furthermore, in a preferred embodiment, cross-plane cross links 23 (FIG. 1) are shut down as satellites in adjacent orbits approach each other near the poles and it is no longer possible to route data packets over these links. Desirably, there are different sets of routing tables for each different constellation configuration.

FIG. 6 illustrates a representation of mapping table 66 for controlling routing tables suitable for use in a preferred embodiment of the present invention. Mapping table 66 illustrates two columns, column 67 and column 68. Column 67 refers to a routing table identifier included in a data packet. Column 68 refers to specific routing tables contained in the memory of the communication node. For example, column 68 preferably refers to table number designators 64 of routing table 60 (FIG. 5).

In one embodiment of the present invention, each data packet is assigned a routing table identifier, preferably by the packet's origination node. The routing table identifier is desirably randomly chosen or chosen sequentially, or assigned by some other way. Desirably, the routing table identifiers have a substantially random distribution. In one embodiment, the last three bits of a data packet comprise the routing table identifier. In this way each data packet has a fairly random routing table identifier between one and eight. In a preferred embodiment, the last three bits of the LCN comprise the routing table identifier.

Column 68 of mapping table 66 lists a routing table number for each routing table identifier in column 67. In the preferred embodiment discussed above, there are eight different routing table numbers, however nothing requires that all tables be specified. At some times, column 68 specifies only routing table number one, while at other times, column 68 specifies different routing tables. For example, when system traffic is light, routing table number one is desirably listed in column 68 for all routing table identifiers of column 67. When system traffic is heavier, both routing table numbers one and two are desirably listed in column 68 for some of the routing table identifiers. As traffic is heavier, other routing table numbers are desirably included in column 68. When traffic is heavier, for example, all routing table numbers are desirably specified (e.g., one for each possible routing table identifier contained in the data packets). Alternatively, for example, when traffic is very heavy, column 68 lists only routing tables seven and eight. There is no requirement that all or any one routing table be included in column 68 of mapping table 66.

The use of mapping table 66 allows the traffic load to be split many different ways. For example, one eighth of the traffic is desirably allocated to each table. Alternatively, five-eighths of the traffic may be allocated to the first table and three-eighths to the second table and none to the other tables. To reflect this split, the table numbers in column 68 would be "1", "1", "1", "1", "1", "2", "2", "2". As can be seen, many combinations are possible. When the higher number tables have higher hop counts, the use of these tables by a node experiencing heavy traffic results in a more even distribution of traffic through other nodes in the constellation.

In the preferred embodiment, a ground controller (e.g., SCS 28 of FIG. 1) sends table control bits to communication node 12 that specify the specific table numbers in column 68. Preferably, the table control bits are a three-bit command. One advantage to this is that a three-bit command requires a small amount of system capacity and time to send. Sending different routing tables, on the other hand, requires a substantial amount of capacity and cannot be done in response to changes in traffic loading in real-time.

Figure 7:
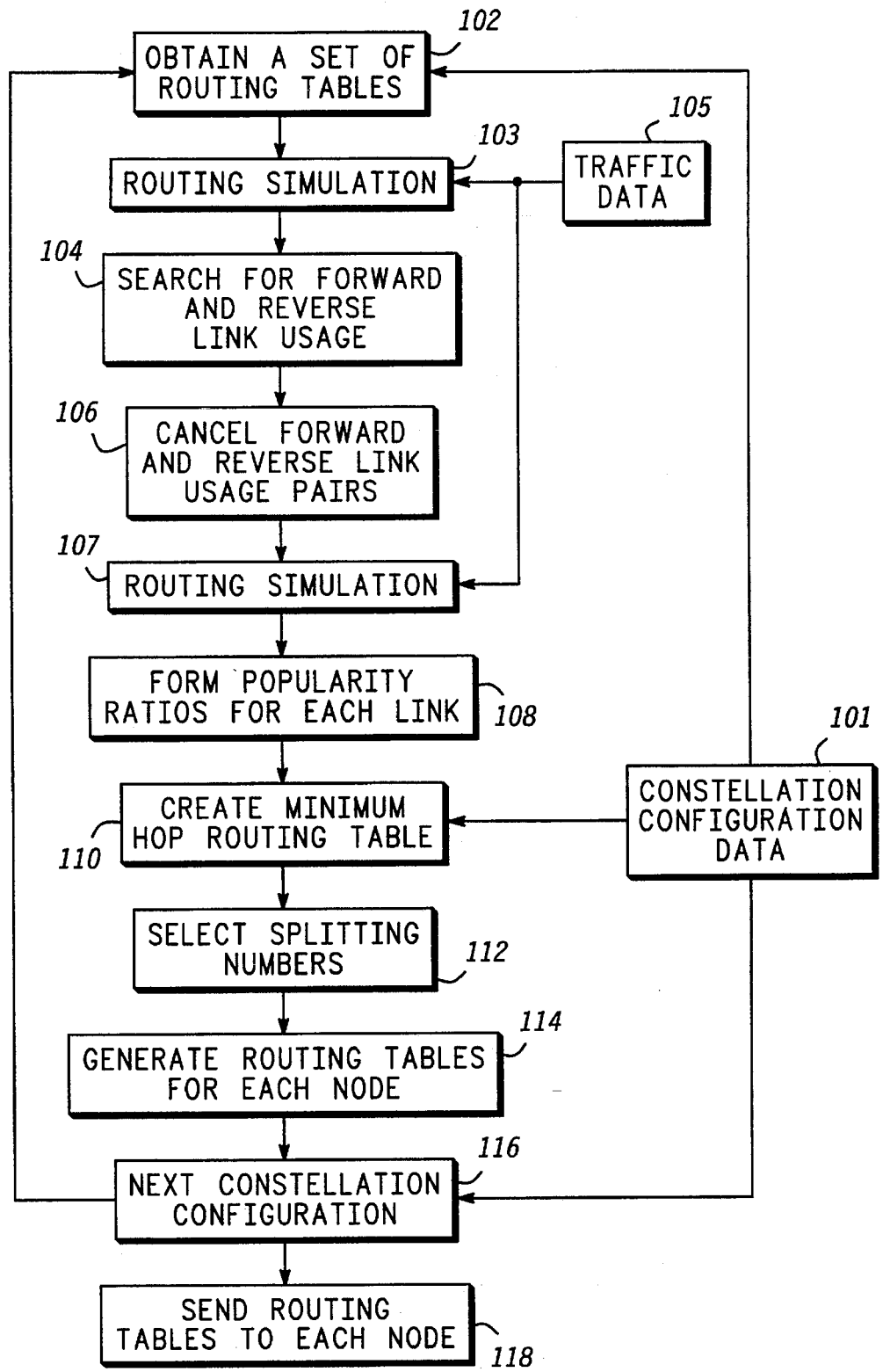
FIG. 7 illustrates an example of a procedure for constructing routing tables suitable for use in a preferred embodiment of the present invention.

FIG. 7 illustrates an example of procedure 100 for constructing routing tables suitable for use in a preferred embodiment of the present invention. The routing tables generated by procedure 100 preferably provide instructions for each of communication nodes 12 in communication system 10 (FIG. 1). Procedure 100 is preferably performed by SCS 28 (FIG. 1) but nothing requires this. Alternatively, portions of procedure 100 are desirably performed by a computer and the routing tables generated are desirably sent to the communication nodes by SCS 28. The routing tables generated in procedure 100 preferably provide routing instructions for different constellation configurations. The nodes are desirably moving with respect to each other and the traffic carrying capacity of the cross-plane cross-links may vary with time and position of the nodes. In the preferred embodiment, this nodal movement defines different constellation configurations.

In task 102, an initial routing instruction set is obtained as a starting point. Virtually any routing instruction set can be used. Those of ordinary skill in the art will understand that numerous techniques exist for relating network node connectivity to routes between a source and destination. For example, techniques such as those discussed by Bellman-Ford examine the network connectivity and calculate routes which satisfy certain constraint criteria. The "Bellman-Ford" algorithm is discussed in "Data Networks", by Dimitri Bertsekas and Robert Gallager. For example, minimum hop path routing tables which are well known in the art are suitable for use in task 102.

Task 102 obtains a routing set for each node in the system for a specific configuration of the constellation. Constellation configuration data 101 is provided. In one embodiment, constellation configuration data 101 provides information on each constellation configuration during a particular twenty-four hour period. Constellation configuration data 101 preferably provides network connectivity information for each five to thirty second interval during an upcoming twenty-four period. Tasks 102-114 are repeated for each constellation configuration. In the preferred embodiment, task 102 obtains multiple sets of tables for each different state of the constellation. For example, in the preferred embodiment shown in FIG. 1, different constellation states exist for each orbital position of the satellites. Cross-links are preferably turned off as the satellites approach the poles.

In addition, different sets of routing tables are obtained in task 102 taking into account actual or anticipated traffic demand for the different orbital positions of the satellites. The exact method of generating or obtaining routing tables is not important for task 102. The routing tables are preferably unique to each node and preferably specify an exit link based on the destination of a data packet. The routing tables desirably also specify an exit link based on both the source and destination of the data packet.

Task 103 performs a traffic routing simulation on communication nodes of the system using the set of routing tables obtained or generated in task 102. Task 103 preferably uses a traffic data base such as historical traffic data 105 for the routing simulation. In general, communication traffic is not evenly dispersed around the system. Some communication links will be used more than others for transporting data packets. Data packets that are being routed to a particular destination node from several different source nodes generally transition across several communication links. In some cases, data packets destined for the same destination node are routed across a single communication link in opposite directions. The forward and reverse use of a communication link for data packets headed toward the same destination node is herein referred to as waste. Task 104 searches for waste that occurs during the routing simulation of task 103.

Figure 8:
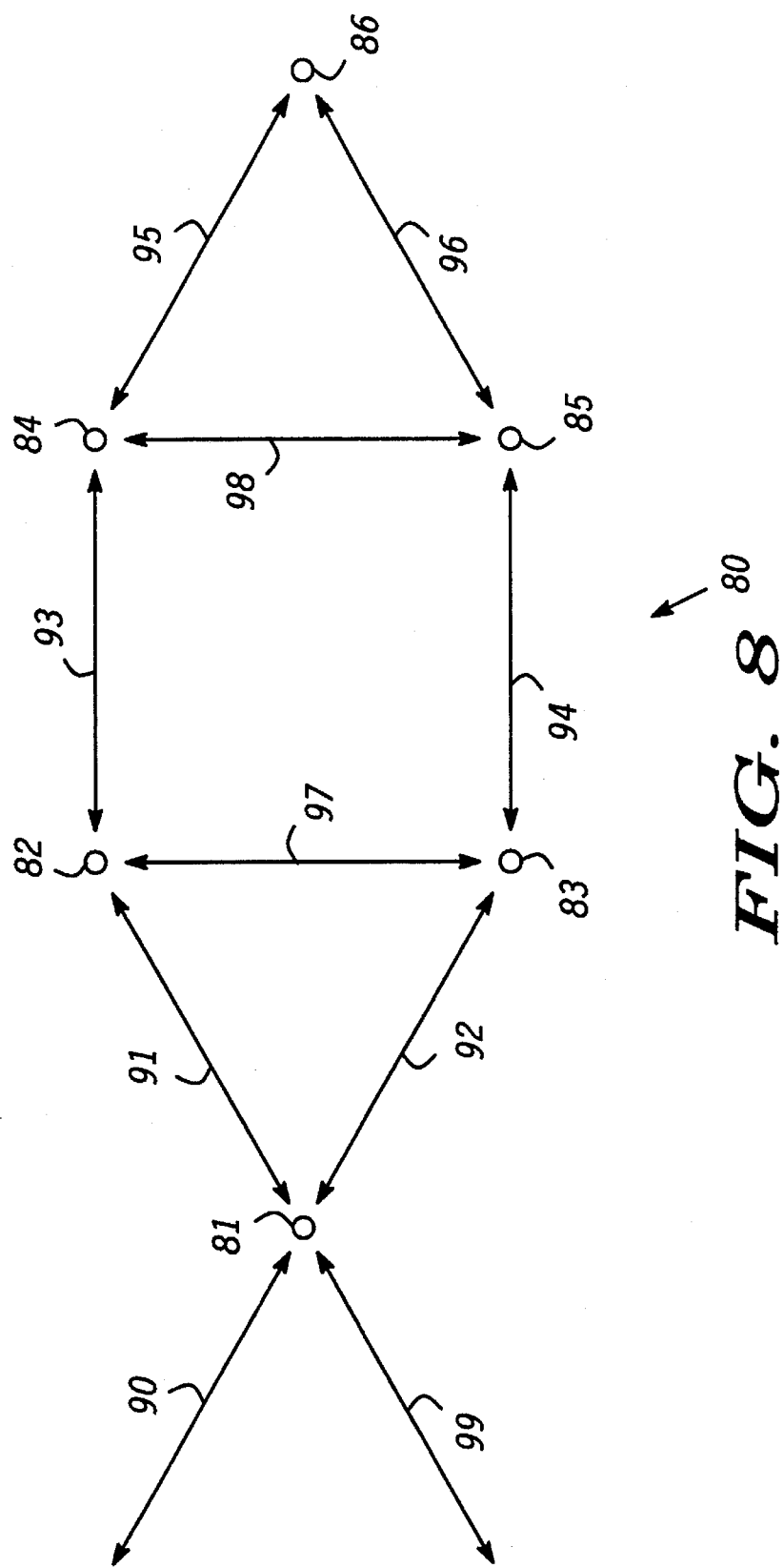
FIG. 8 illustrates a small portion of a constellation of communication nodes connected by communication links.

The concept of waste can be easily understood by referring to FIG. 8 which illustrates a small portion 80 of a constellation of communication nodes connected by communication links. For illustrative purposes, only six communication nodes are shown, nodes 81–86. Communication nodes 81–86 are coupled via links 91–98 as shown in FIG. 8. In the preferred embodiment, communication nodes 81–86 are analogous to satellite communication nodes 12 (FIG. 1 and FIG. 3) and links 90–99 are analogous to links 21 or 23 (FIG. 1). Although not shown in FIG. 8, each communication node of the preferred embodiment has four cross links coupling to four other communication nodes. Nothing requires that there be four communication links, more or less than four links will work equally well for the purpose of the present invention. In the preferred embodiment many more communication nodes than those shown in FIG. 8 are similarly connected. For example, node 81 couples with communication links 90 and 99 which preferably couple with other nodes in the system.

Data packets are routed to destination node 86 for example, from several source nodes elsewhere in the constellation. Data packets destined for node 86 arrive at node 81 and are sent to node 82 over link 91. From node 82, the data packets are routed to node 83 over link 97, and then to node 85 over link 94, and finally to node 86 over link 96. This route results from the use of routing tables obtained in task 102.

Other data packets destined for node 86 from another source node arrive at node 81 and instead are routed over link 92 to node 83, then over link 97 to node 82, then over link 93 to node 84, then over link 96 to node 86. This route also results from the use of routing tables.

In this example, note that data packets destined for node 86 are traveling in both directions on link 97. This is one example of the existence of waste that occurs by the use of routing tables obtained in task 102.

Waste occurs in other situations. For example, when a particular link is overloaded, a portion of the traffic that is rerouted can result in waste. For example, link 94 can become overloaded based on historical traffic demand and as a result, some traffic must be rerouted. Data packets arriving at node 83 from node 81 are re-routed to node 82 over link 97, and then routed to node 84 before being routed to node 86. When this occurs, data packets destined for node 86 are traveling over link 97 in both directions. This is another example of the occurrence of waste.

Referring back to FIG. 7, task 104 searches for occurrences of waste by identifying forward and reverse link usage of links for a particular destination node. Preferably, each link is searched for the occurrence of waste for each destination node in the constellation. A looping procedure is preferably used for this task.

Task 106 forms pairs for each incidence of a forward and reverse link usage identified in task 104 for each link in the constellation. Some forward or some reverse link usage may not be able to be paired. Task 106 then cancels each of these pairs of forward and reverse link usage. In a preferred embodiment, a stack is used to manage the pairs and the two piles of paths. When a pair of paths is canceled, new paths are generated.

In the example of FIG. 8, the forward and reverse link usage to destination node 86 on link 97 are canceled. In one case, some of the data packets that were routed from node 81 over link 92 to node 83, then to node 82 over link 97, then to node 84 over link 93, for example, are re-routed from node 83 to node 85 over link 94. At about the same time, in another case, some of the data packets that were routed from node 81 over link 91 to node 82, and then to node 83 over link 97, are re-routed over link 93 to node 84. Each data packet that is re-routed in the first case is paired with another data packet that is re-routed in the second case.

In task 106, pairs of forward and reverse link usage for a particular destination node are canceled until no more pairs exist. When there are more paths in one direction than in the other direction, some uncanceled link usage will exist in that one direction. Once task 106 is completed, all waste has desirably been eliminated.

Task 107 performs a routing simulation on the entire constellation using the new paths generated in task 106. The routing simulation preferably uses historical traffic data 105.

Task 108 finds all routes through the constellation having a particular destination node. Task 108 forms popularity ratios based on the number of times a particular exit link of a particular node is used. For each node in the system, popularity ratios are formed for all traffic headed for a particular destination node. A popularity ratio is the percent of traffic routed through each of the exit links of a particular node headed for one destination node. For example, in a preferred embodiment where the communication nodes have four exit links, the sum of the popularity ratio's for the four links would be 100% for all traffic headed to a particular destination node.

Refer to FIG. 8 to illustrate the formation of popularity ratios in a preferred embodiment where the communication nodes have four exit links. To form popularity ratios for all traffic through node 81 to destination node 86, task 108 finds all traffic that is routed through node 81 destined for node 86. For a particular constellation configuration and traffic load, for example, 75% of the traffic for destination node 86 exits node 81 through link 91, 15% of the traffic for destination node 86 exits node 81 through link 92, while 5% of the traffic for destination node 86 exits node 81 through each of links 90 and 99. The popularity ratios would be 75% for link 91, 15% for link 92, 5% for link 90 and 5% for link 99.

In some situations, there is no traffic through a particular node headed for a certain destination node. In this situation, no popularity ratios are formed.

Task 108 is preferably performed for each node in the system for each possible destination node in the system. For example, in the preferred embodiment shown in FIG. 1 where there are 66 satellite communication nodes, task 108 is performed 65 times for each of the sixty-six nodes which results is the formation of (65×66) 4290 sets of popularity ratios.

Figure 9:
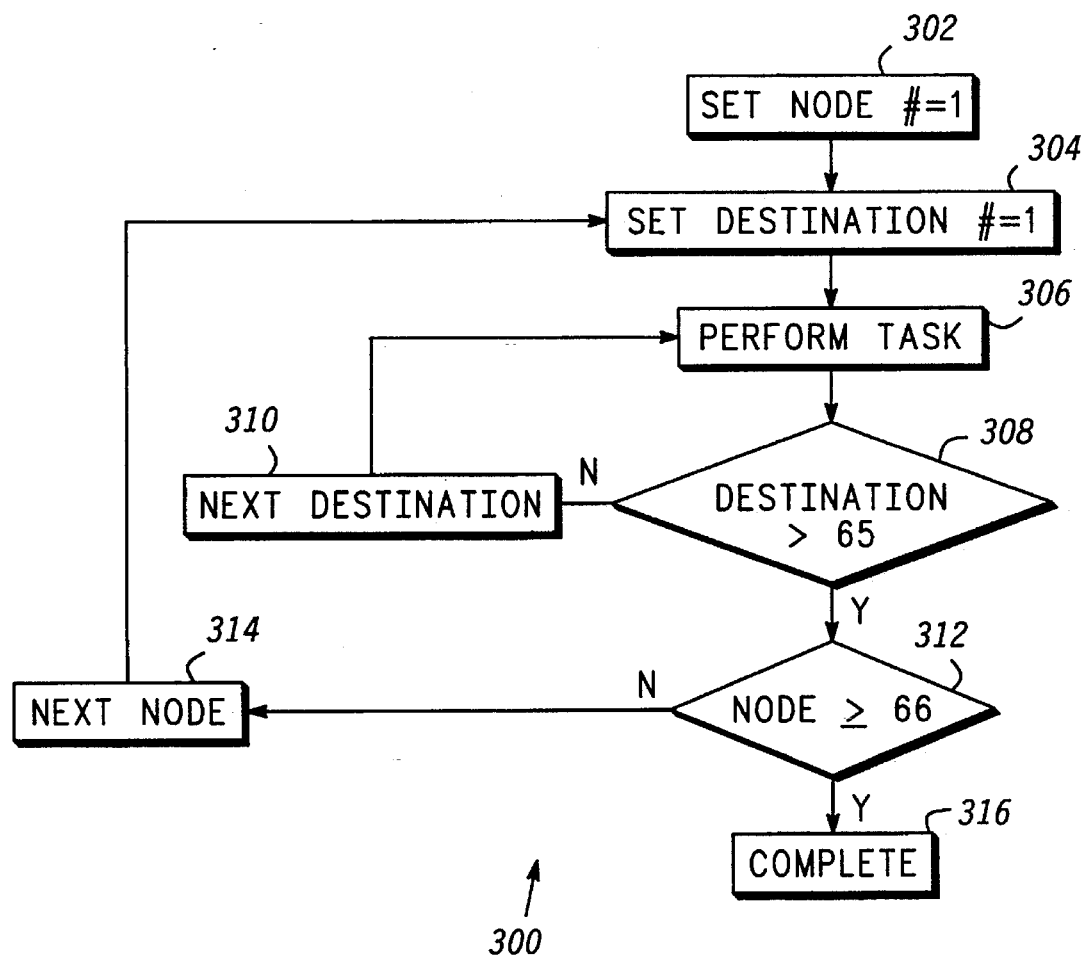
FIG. 9 illustrates a looping procedure suitable for use in a preferred embodiment of the present invention.

FIG. 9 illustrates a looping procedure 300 suitable for use by task 108 (FIG. 7) in a preferred embodiment of the present invention. Procedure 300, when used in conjunction with task 108 of procedure 100 generates the popularity ratios for each of the links of each node. Procedure 300 is written for a preferred embodiment of sixty-six communication nodes, however more or less than sixty-six nodes can be used. In task 302, the node number is set to one. The procedure starts at the first node for which routing tables are generated. In task 304, the destination is set to the first destination node. When procedure 300 is used in conjunction with task 108 (FIG. 7), task 306 generates the popularity ratios as discussed above for traffic routed through node number one to the first destination. Task 308 determines if all sixty-five destination nodes have been considered, and when they have not, task 310 sets the destination to the next destination node. The loop of tasks 306, 308 and 310 create popularity ratios for each exit link based on traffic for all destination nodes through a single communication node. When the popularity ratios for traffic headed for all destination nodes have been generated, task 312 is performed.

Task 312 determines if all communication nodes have been considered, and if not, task 314 sets the node number to the next node number. Task 304 through 312 are repeated for the next node forming popularity ratios for each destination for the next node. When all nodes have their popularity ratios formed, task 316 is performed and procedure 300 is complete. Task 108 of procedure 100 is complete.

In task 110 of FIG. 7, a routing table is provided for the particular constellation configuration. Minimum-hop routing tables are preferred; however, routing tables other than minimum-hop tables are suitable.

Task 112 selects packet splitting numbers. The table control bits used in column 68 of mapping table 66 (FIG. 6) are preferably related to the packet splitting numbers selected in task 112. The quantity of packet splitting numbers is dependent on the quantity of routing tables to be generated for each communication node. In the preferred embodiment, for N routing tables there are N splitting numbers. In this embodiment, there are eight routing tables for each node, however more or less than eight tables can be used.

Task 112 selects packet splitting numbers in one of several ways. For example if an even balance of traffic between eight tables is desired, the splitting numbers for the eight tables would be 0.125, 0.250, 0.375, 0.500, 0.625, 0.750, 0.875, and 1.000, respectively. Note that the numbers increase by one-eighth.

The use of packet splitting numbers allows for traffic to be distributed over different routes through the use of different routing tables. For example, when traffic demand is greater than predicted for some nodes or links in the constellation, it is desirable to route data packets over different routes and links through the constellation. SCS 28 (FIG. 1) directs the nodes to route data packets using different sets of routing tables, for example, the sets of routing tables generated in task 114. SCS 28 preferably sends table control bits to the communication nodes which instructs the nodes to use certain routing tables. For example, table control bits specify the table numbers of column 68 of mapping table 66 (FIG. 6).

Task 114 generates a set of routing tables for each node using the popularity ratios formed in task 108 and the splitting numbers selected in task 112. The routing tables serve as routing instruction sets for the nodes. In the preferred embodiment, task 114 generates eight routing tables for each node in the constellation, however nothing prevents more or less tables from being generated.

Task 114 considers for each node, all traffic to each destination node. In the preferred embodiment of sixty-six satellite communication nodes in the constellation, for each of the sixty-six nodes, task 114 uses the popularity ratios for traffic destined each of the sixty-five possible destination nodes. The steps of task 114 can either be performed in parallel or series.

For a particular node where no traffic is being routed to a certain destination node, all routing tables generated for that particular node preferably identify the exit link identified in the minimum hop table provided by task 110. In these situations, no popularity ratios were formed because there was no traffic through that particular node for a certain destination.

Where popularity ratios for a node have been formed in task 108, the first routing tables are assigned the most popular exit link until the splitting number selected for that table exceeds the popularity ratio of that exit link. The next routing tables are assigned the second most popular exit link until the splitting number for that table exceeds the sum of the popularity ratio of the second most popular link and the first most popular link. The exit links that are assigned are listed as entries in routing table 60 as routing instructions 61 (FIG. 5), for example.

To illustrate the generation of the elements of routing tables using splitting numbers and popularity ratios, consider a node having four exit links with popularity ratios to a certain destination node of 76% for the first exit link, 24% for the second exit link, and 0% for the other two exit links. Also consider the example where eight routing tables for each destination are generated and the splitting numbers selected are 0.125 for table number one, 0.250 for table number two, 0.375 for table number three, 0.500 for table number four, 0.625 for table number five, 0.750 for table number six, 0.875 for table number seven, and 1.000 for table number eight. Task 114 generates a table entry for each routing table for the specific destination node being considered.

In this example, the table entries preferably indicate one of the four exit links. In this example, the first exit link is the entry for the first table because the splitting number for the first table (0.125) does not exceed the popularity ratio for the first exit link (0.76). The first exit link is also specified for tables two through six because the splitting number for each of these tables (0.250, 0.375, 0.500, 0.625, 0.750) does not exceed the popularity ratio (0.76) of the first exit link. The second exit link, however, is specified for table seven because the splitting number for table seven (0.875) is less than or equal to the popularity ratio of the second exit link (0.24) added to the popularity ratio of the first link (0.76). The second exit link is also specified in routing table number eight because the splitting number for table eight (1.000) is less or equal to than the popularity ratio of the second exit link (0.24) added to the popularity ratio of the first link (0.76).

Depending on the number of nodes, the number of destinations and the number of tables being generated, those of ordinary skill in the art can implement equations to be used by a computer to implement the elements of task 114.

FIG. 9 illustrates a looping procedure 300 suitable for use by task 114 in a preferred embodiment of the present invention. Procedure 300, when used in conjunction with task 114 of procedure 100 generates the individual elements of the routing tables. Procedure 300 is written for a preferred embodiment of sixty-six communication nodes, however more or less than sixty-six nodes can be used. In task 302, the node number is set to one. The procedure starts at the first node for which routing tables are generated. In task 304, the destination is set to the first destination node. Task 306 generates the routing table entries as discussed above for traffic routed through node number one to the first destination. Task 308 determines if all sixty-five destinations have been considered, and when they have not, task 310 sets the destination to the next destination. The loop of tasks 306, 308 and 310 create routing table entries for all destinations for a single communication node. When table entries for all destinations have been generated, task 312 is performed.

Task 312 determines if all communication nodes have been considered, and if not, task 314 sets the node number to the next node number. Tasks 304 through 312 are repeated for the next node generating routing table entries for the next node. When all nodes have their routing tables generated, task 314 is performed and task 114 of procedure 100 is complete.

Task 116 determines if routing tables have been generated for all constellation configurations. When there are other constellation configurations, tasks 102–114 are repeated to generate routing tables for the other constellation configurations. In one embodiment, constellation configuration data 101 provides information on each constellation configuration during a particular twenty-four hour period. For example, during a twenty-four hour period in the preferred embodiment shown in FIG. 1, the constellation configuration is constantly changing. Constellation configuration data 101 preferably provides information for each five to thirty second time interval for a twenty-four period. In this embodiment, tasks 102–114 are repeated for each five to thirty second time interval of a twenty-four period generating a set of routing tables for each interval. Nothing prevents tasks 102–114 from being repeated for longer or shorter time intervals.

Once all routing tables are generated for each constellation configuration, the routing tables are preferably transferred to SCS 28 (FIG. 1) where they are stored in storage medium 52 (FIG. 2) until a time where they are sent to each of the communication nodes. Task 118 sends the routing tables to each communication node in the system. Preferably, task 118 is performed once every twenty-four hours. In the preferred embodiment, task 118 is performed by transmitter 59 (FIG. 4). After the nodes receive the routing tables, the routing tables are stored in a memory structure such as memory 46 (FIG. 3).

Figure 10:
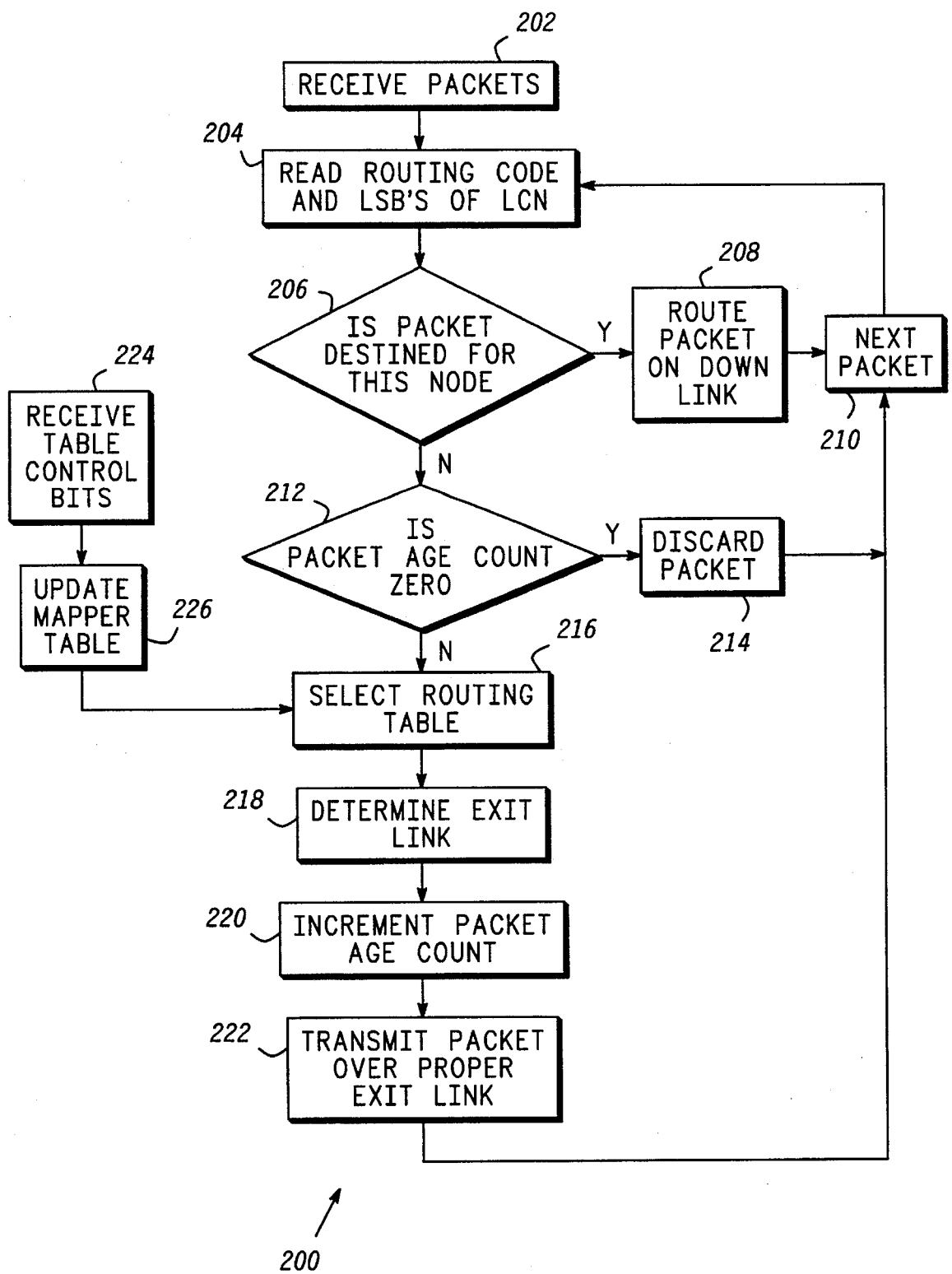
FIG. 10 illustrates a procedure for routing data packets suitable for use in a preferred embodiment of the present invention.

FIG. 10 illustrates an example of procedure 200 for routing data packets suitable for use in a preferred embodiment of the present invention. Procedure 200 is performed whenever a data packet is received at a communication node. In task 202, a stream of data packets is received at communication node. In the preferred embodiment, task 202 is performed by cross-link transceiver 43 (FIG. 3). In a preferred embodiment, packets are received by several cross-link antennas 41 (FIG. 3) during receive timing windows.

In task 204, a routing table identifier and a routing code is read from a first data packet from the stream of data packet received in task 202. In the preferred embodiment, the routing table identifier corresponds to the three least significant bits (LSB's) of the LCN discussed above. The routing code preferably includes destination routing code 34 (FIG. 2) identifying a destination node. However, destination routing code 34 may identify both a source and a destination node. In the preferred embodiment, task 204 is performed by processors that are included in controller 44 (FIG. 3). In one embodiment of the present invention, task 204 also reads the bits allocated to packet age from packet header 32 (FIG. 2).

Task 206 determines if the data packet is destined for the present node, based on the destination routing code. If the data packet is destined for this node, task 208 routes that data packet on one of the down-links, for example, links 16 (FIG. 1). Task 210 selects the next data packet and task 204 is repeated for that next data packet.

When the data packet is not destined for the present node, task 212 is performed. Task 212 determines if the packet age count is zero, and if so, task 214 discards the packet. The packet age count associated with a data packet is preferably related to the number of nodes the data packet has transitioned. In a preferred embodiment, the packet age is decremented every time a data packet transitions a communication node. In the preferred embodiment, when the packet age count normally begins at 18, and when there are several failed links between the communication nodes in the constellation, the packet age count may begin at 25, for example. Packet age count numbers other than 18 and 25 can be used as well depending on the state of the constellation and the amount of delay that is acceptable. After task 214, task 210 is performed and procedure 200 goes to the next data packet.

When the packet age count is not zero, task 216 is performed. In task 216, a routing table corresponding to the routing table identifier is selected. For example, a table such as mapping table 66 (FIG. 6) is desirably used. In the preferred embodiment, the table identifier corresponds to the three least significant bits (LSB's) of the LCN of routing destination code 34 (FIG. 2). In this embodiment, one of eight possible routing tables is chosen. For example, the three LSB's will indicate one of eight rows in column 67 (FIG. 6). Task 216 reads the corresponding table number in column 68 (FIG. 6). The table numbers in column 68 are generated from tasks 224 and 226.

In task 224, mapping table control bits are received by the communication node. In task 226, the communication node updates mapping table 66 (FIG. 6) with table control bits. For example, in a preferred embodiment, a ground controller (SCS 28 FIG. 1) sends a 24-bit command to communication node 12 that specifies specific table numbers for column 68 (FIG. 6). Desirably, these table control bits are related to the packet splitting numbers used in generating the routing tables in task 112 and task 114 of procedure 100 (FIG. 7). For example, if an even balance of traffic between eight tables is desired, the splitting numbers would be 0.125, 0.250, 0.375, 0.500, 0.625, 0.750, 0.875, and 1.00. In this case, the table numbers in column 68 would be "1", "2", "3", "4", "5", "6", "7", and "8". This would result in an approximately even split between all eight tables when the three LSB's of the LCN of the data packets are randomly distributed.

On the other hand, for example, when the packet splitting numbers selected in task 112 were 0.500, 0.750, 0.875 and 1.00, for four routing tables, the numbers in column 68 are desirably "1", "1", "1", "1", "2", "2", "3", and "4". In this way, 50% of the traffic would be routed using the first table, while 25% would be routed using the second table, while 12.5% of the traffic would be routed using each of tables three and four.

In another embodiment of the present invention, the table control bits received in task 224 are not related to the packet splitting numbers used in generating the routing tables. Table control bits are chosen so as to direct most or all of the traffic over certain tables. For example, tables seven and eight desirably have significantly higher hop counts than the lower number tables. When traffic demand is predicted to peak, or peak loading is being experienced, table control bits are received that direct a higher percentage of data packets to be routed over tables seven and eight.

In a preferred embodiment, when additional traffic capacity is needed, a command is sent by a central controller to change mapping table 66 (FIG. 6). The time required for this to occur is generally less than one minute. A human operator at a control facility preferably makes the decision when additional capacity is needed, but nothing requires this. A computer may be programmed to make this decision in alternative embodiments.

Once task 216 selects a routing table, task 218 reads an exit link specified in the routing table based on the packet routing code. For example, routing table 60 (FIG. 5) is suitable for determining an exit link based on routing codes that include both source and destination nodes. However, in another embodiment of the present invention where only destination nodes are included in routing code 34 (FIG. 2), routing tables which specify exit links for destination nodes are provided in the node.

Task 220 increments the packet age counter discussed above in task 204. The packet age counter is preferably part of packet header 32 (FIG. 2).

In task 222, the data packet is put in a queue for routing over the exit link determined in task 216. The data packet is subsequently routed to the exit link to the next communication node. In a preferred embodiment, packets are transmitted with cross-link antennas 41 (FIG. 3) during transmit timing windows. Preferably, the transmit and receive timing windows of all communication nodes in the system are synchronized such that satellites 12 (FIG. 1) transmit at the same time, and receive at the same time.

In task 210, a next packet is selected from the stream of packets received in task 202. Tasks 204–222 are then repeated for the next data packet.

While the invention has been described in terms of specific examples and with a specific preferred embodiment, it is evident that many alternatives and variations will be apparent to those skilled in the art based on the description herein, and is intended to include such variations and alternatives in the claims.

As described herein, the advantages of the present invention will be apparent to those of skill in the art. An advantage of present invention is that the data packets are routed in a dynamic and moving communication system. Another advantage is that the data packet routing takes into account changes in the connectivity between the communication nodes. Another advantage is that the data packet routing takes into account actual or historical traffic demand. Another advantage is that link overloads are reduced taking into account link capacity and actual traffic. Another advantage is that the data packet routing is responsive to changes in system traffic.

Another advantage is that the data packet routing reduces the amount of data packets having the same destination traveling in both directions on one communication link. Paths are shortened and delays are reduced. Another advantage is that uniformity in the usage of links is achieved while limiting the number of hops between source and destination.

What is claimed is:

1. A method of routing data packets among nodes of a communication system, said nodes coupled to each other by links wherein each of said nodes have a plurality of routing tables stored therein and a mapping table stored therein, said mapping table referring to one of said plurality of routing tables for each of a plurality of routing table identifiers, said method comprising the steps of:

receiving mapping table control bits at one of said nodes;

updating said mapping table using said mapping table control bits, the updating step causing said mapping table to reference other routing tables for each of said routing table identifiers;

receiving a data packet at said one of said nodes, said data packet including one of said routing table identifiers;

reading a destination routing code and said routing table identifier from said data packet;

identifying one routing table of said plurality of routing tables by indexing said mapping table using said routing table identifier;

indexing said one routing table based on said destination routing code to determine an exit link; and routing said data packet away from said one of said nodes over said exit link.

2. A method as claimed in claim 1 further comprising the step of assigning to each of said data packets, one routing table identifier by a source node wherein said routing table identifiers assigned in the assigning step exhibit a substantially randomly distribution.

3. A method as claimed in claim 1 wherein each of said data packets has a header, and wherein said routing table identifier includes least significant bits (LSB's) of said header, and wherein the step of reading includes the step of reading said LSB's of said header.

4. A method as claimed in claim 3 wherein said header includes a logical channel number (LCN) and wherein the step of reading includes the step of reading LSB's of said LCN.

5. A method as claimed in claim 1 further comprising the steps of:

generating said mapping table control bits for a heavy traffic load situation; and transmitting said mapping table control bits to each of said nodes when said heavy traffic load situation occurs, and wherein the updating step includes the step of updating said mapping table using said mapping table control bits causing said mapping table to reference each of said routing tables for each of said routing table identifiers.

6. A communication system that routes data packets comprising:

a plurality of nodes, each node of said plurality having a memory for storing a plurality of routing tables and a mapping table therein, said mapping table referring to one of said plurality of routing tables for each of a plurality of routing table identifiers;

communication links coupling said nodes;

a first transceiver associated with each of said nodes for receiving mapping table control bits;

a processor associated with each of said nodes with means for updating said mapping table using said mapping table control bits, the processor causing said mapping table to reference other routing tables for each of said routing table identifiers; and a second transceiver associated with each of said nodes for reading a destination routing code and said routing table identifier from said data packets, wherein said processor has means for identifying one routing table of said plurality of routing tables by indexing said mapping table using said routing table identifier and said destination routing code to determine an exit link, said exit link being one of said communication links, and wherein said second transceiver routes said data packets away from one of said nodes over said exit link.

7. A communication system as claimed in claim 6 wherein said processor includes means for assigning each of said data packets said routing table identifier by a source node wherein said routing table identifiers exhibit a substantially randomly distribution.

8. A communication system as claimed in claim 6 wherein each of said data packets has a header, and wherein said routing table identifier includes least significant bits (LSB's) of said header, and wherein the transceiver includes means for reading said LSB's of said header.

9. A communication system as claimed in claim 8 wherein said header includes a logical channel number (LCN) and wherein the means for reading includes means for reading LSB's of said LCN.

10. A communication system as claimed in claim 6 further comprising a control facility that includes:

means for generating said mapping table control bits for a heavy traffic load situation; and means for transmitting said mapping table control bits to each of said nodes when said heavy traffic load situation occurs, and wherein the means for updating includes means for updating said mapping table using said mapping table control bits causing said mapping table to reference each of said routing tables for each of said routing table identifiers.

11. A method of routing data packets among nodes of a communication system, each of said nodes having a mapping table and a plurality of routing tables stored therein, said method comprising the steps of:

receiving mapping table control bits at one of said nodes, said mapping table control bits causing said mapping table to reference particular routing tables of said plurality of routing tables for a plurality of routing table identifiers;

updating said mapping tables using said mapping table control bits, the updating step causing said mapping tables to reference other routing tables for each of said routing table identifiers;

reading a destination routing code and one of said routing table identifiers from a data packet;

identifying one routing table of said plurality of routing tables by indexing said mapping table using said one of said routing table identifiers;

identifying an exit link by indexing said one routing table based on said destination routing code; and routing said data packet away from said one of said nodes over said exit link.

\* \* \* \* \*

UNITED STATES PATENT AND TRADEMARK OFFICE
CERTIFICATE OF CORRECTION

PATENT NO. : 5,579,307
DATED : November 26, 1996
INVENTOR(S) : Peter J. Richetta et al.

It is certified that error appears in the above-identified patent and that said Letters Patent is hereby corrected as shown below:

In column 18, claim 2, line 32, delete "randomly" and insert --random--.

In column 19, claim 7, line 18, delete "randomly" and insert --random--.

Signed and Sealed this

Thirtieth Day of September, 1997

Attest:

BRUCE LEHMAN

Attesting Officer

Commissioner of Patents and Trademarks